(12) United States Patent
White et al.

(10) Patent No.: US 9,744,837 B2
(45) Date of Patent: Aug. 29, 2017

(54) ADJUSTABLE VEHICLE COVER

(71) Applicant: Kraco Enterprises, LLC., Compton, CA (US)

(72) Inventors: Craig A. White, Los Angeles, CA (US); Alexandria R. Hill, Redondo Beach, CA (US); Johnny Chen Wu, Los Angeles, CA (US); Arthur Carl Sepmeyer, Redondo Beach, CA (US)

(73) Assignee: Kraco Enterprises, LLC, Compton, CA (US)

( * ) Notice: Subject to any disclaimer, the term of this patent is extended or adjusted under 35 U.S.C. 154(b) by 0 days.

(21) Appl. No.: 15/136,194

(22) Filed: Apr. 22, 2016

(65) Prior Publication Data
US 2016/0311299 A1    Oct. 27, 2016

Related U.S. Application Data

(60) Provisional application No. 62/152,263, filed on Apr. 24, 2015.

(51) Int. Cl.
*B60J 11/04* (2006.01)
(52) U.S. Cl.
CPC .................... *B60J 11/04* (2013.01)
(58) Field of Classification Search
CPC .............. B60J 11/04; B60J 11/06; B60J 11/08
USPC ..... 150/166, 168; 296/97, 98, 136.01, 135.1
See application file for complete search history.

(56) References Cited

U.S. PATENT DOCUMENTS

| | | | | |
|---|---|---|---|---|
| 2,307,213 A | * | 1/1943 | Goldston | A41D 1/06 2/269 |
| 2,787,311 A | | 4/1957 | Cohen et al. | |
| 2,914,773 A | * | 12/1959 | Walter | A41D 27/10 2/232 |
| 2,966,855 A | * | 1/1961 | Barco | F42B 3/087 102/323 |

(Continued)

FOREIGN PATENT DOCUMENTS

| | | |
|---|---|---|
| CN | 202006721 U | 10/2011 |
| CN | 202528814 U | 11/2012 |
| WO | 9014241 A1 | 11/1990 |

OTHER PUBLICATIONS

U.S.; Search Report and Written Opinion in International Patent Application No. PCT/US16/28920 dated Jul. 27, 2016; 11 pages.

*Primary Examiner* — Sue A Weaver
(74) *Attorney, Agent, or Firm* — Wood Herron & Evans LLP

(57) ABSTRACT

An adjustable vehicle cover configured to fit a variety of vehicles. The adjustable vehicle cover includes a one-piece body and at least first and second engagement features. The one-piece body includes at least a top, oppositely disposed first and second sides adjacent to the top, and oppositely disposed first and second ends. The at least first and second engagement features are disposed intermediate the first and second ends and extend in a direction generally transverse to a longitudinal direction. The at least first and second engagement features are operable to convert the one-piece body between at least a first configuration and a second configuration that is longer than the first configuration in the longitudinal direction. The at least first and second engagement features are joined in the first configuration and are spaced apart in the second configuration.

14 Claims, 15 Drawing Sheets

(56) References Cited

U.S. PATENT DOCUMENTS

| | | | |
|---|---|---|---|
| 4,573,218 A | 3/1986 | Saggs | |
| 4,925,234 A | 5/1990 | Park et al. | |
| 4,940,276 A | 7/1990 | Madison | |
| 5,193,877 A * | 3/1993 | George, Jr. | B60J 11/00 118/505 |
| 5,497,819 A | 3/1996 | Chiang | |
| 5,632,223 A | 5/1997 | Bray et al. | |
| 5,653,492 A | 8/1997 | Mills | |
| 5,979,937 A | 11/1999 | Yoshida et al. | |
| 6,003,929 A | 12/1999 | Birdsell | |
| 6,073,282 A | 6/2000 | Leeper et al. | |
| 6,517,141 B1 | 2/2003 | Su | |
| 7,125,066 B2 * | 10/2006 | McNamee | B60J 11/00 150/166 |
| 7,159,631 B2 | 1/2007 | Yang | |
| D737,195 S | 8/2015 | Ein | |
| 2007/0252406 A1 * | 11/2007 | Webber | B60J 11/00 296/136.12 |
| 2011/0095561 A1 * | 4/2011 | Li | B60J 11/04 296/136.13 |
| 2011/0291447 A1 * | 12/2011 | Mount | B60N 2/5825 297/216.13 |
| 2015/0240514 A1 * | 8/2015 | Ying | E04H 15/40 135/126 |

* cited by examiner

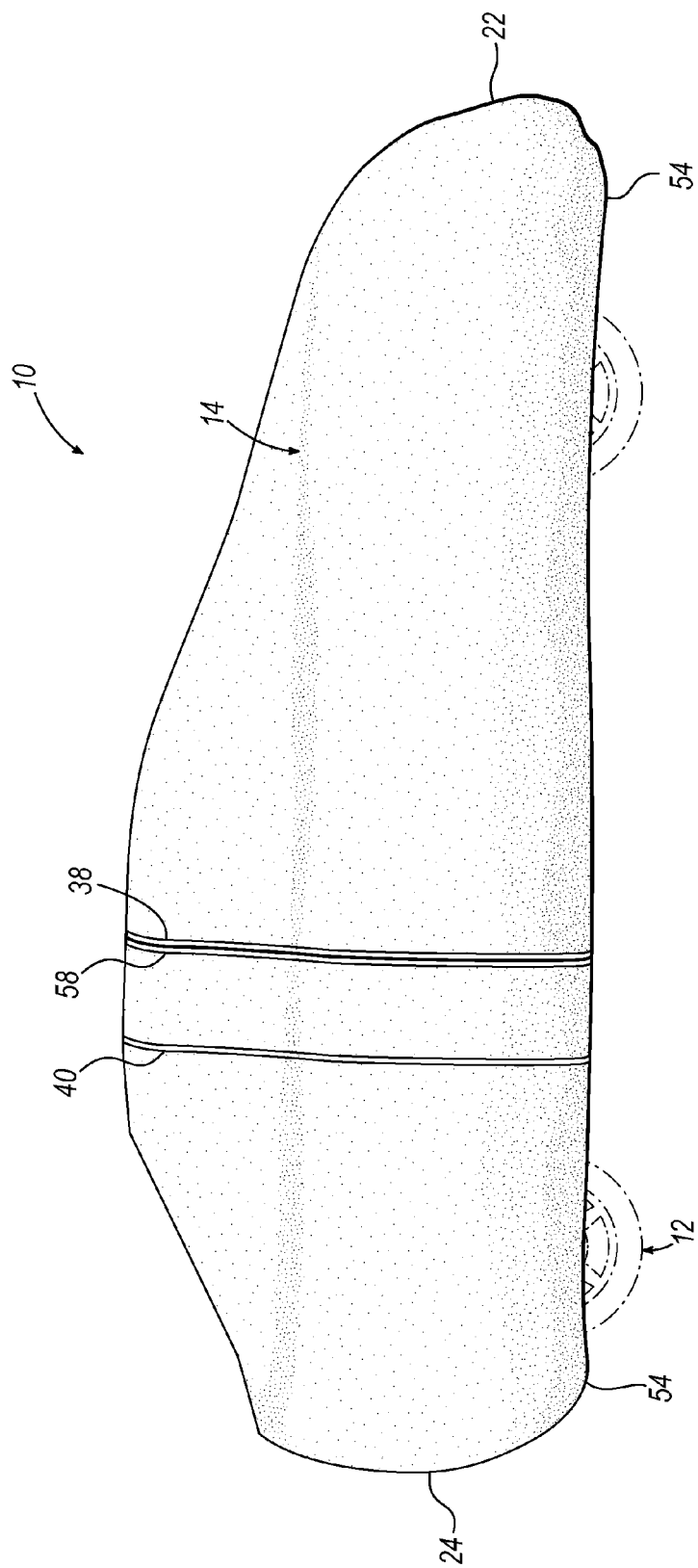

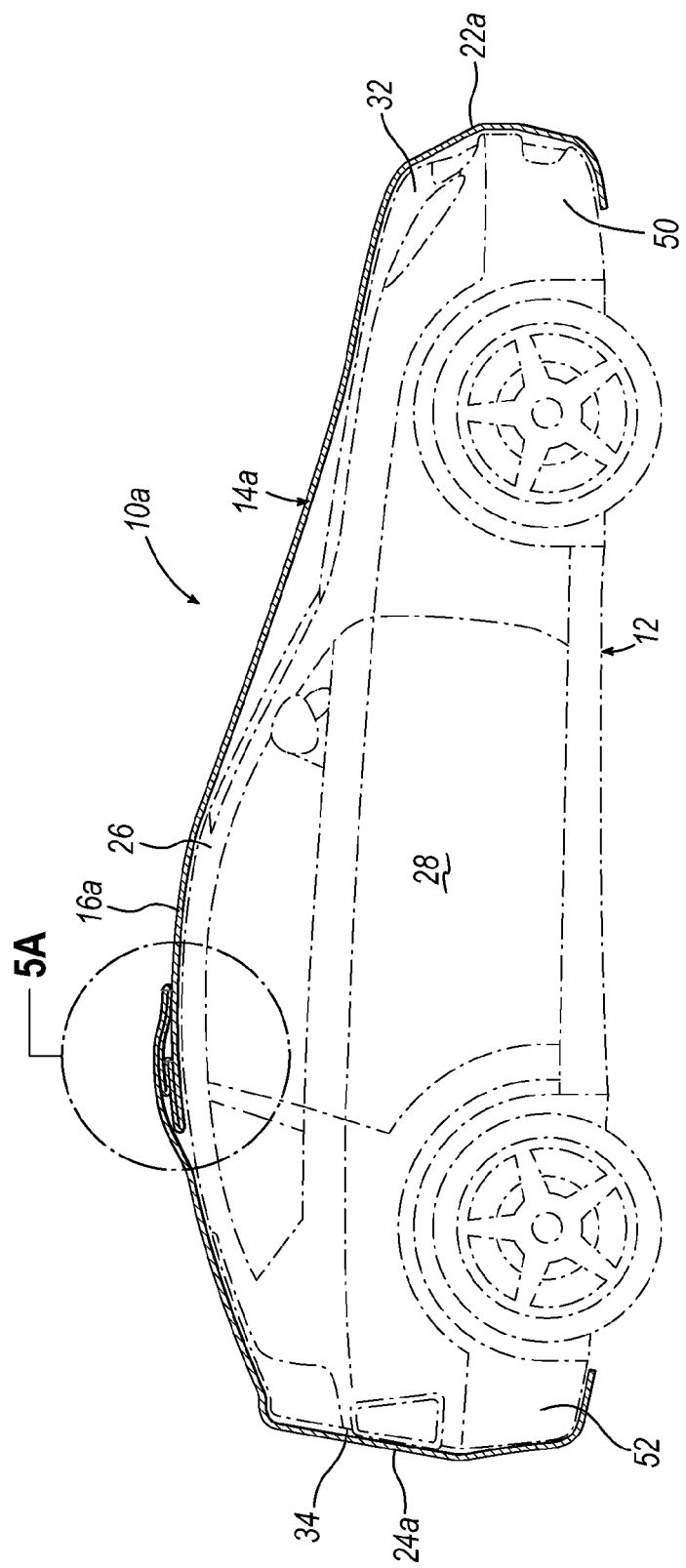

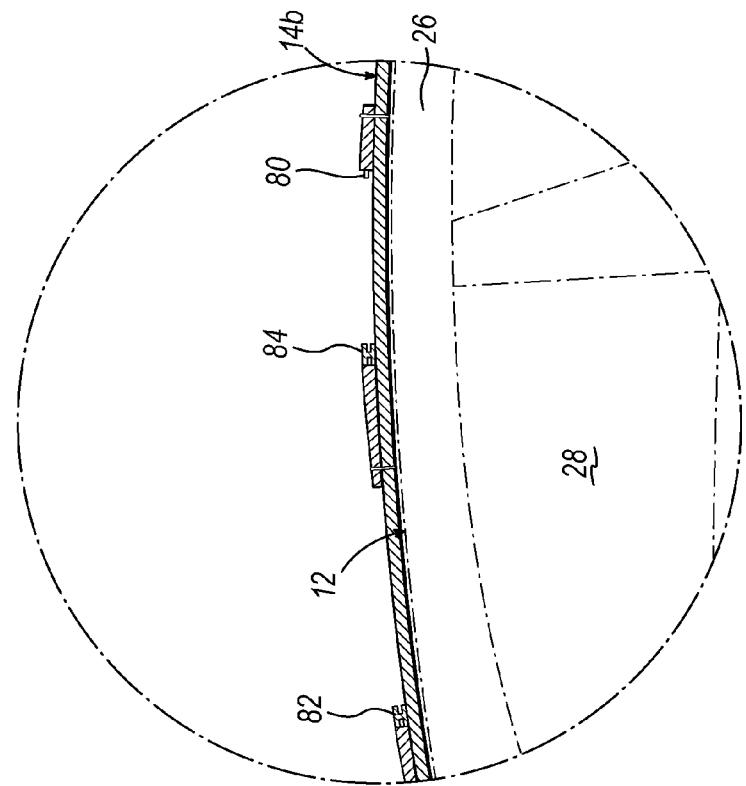
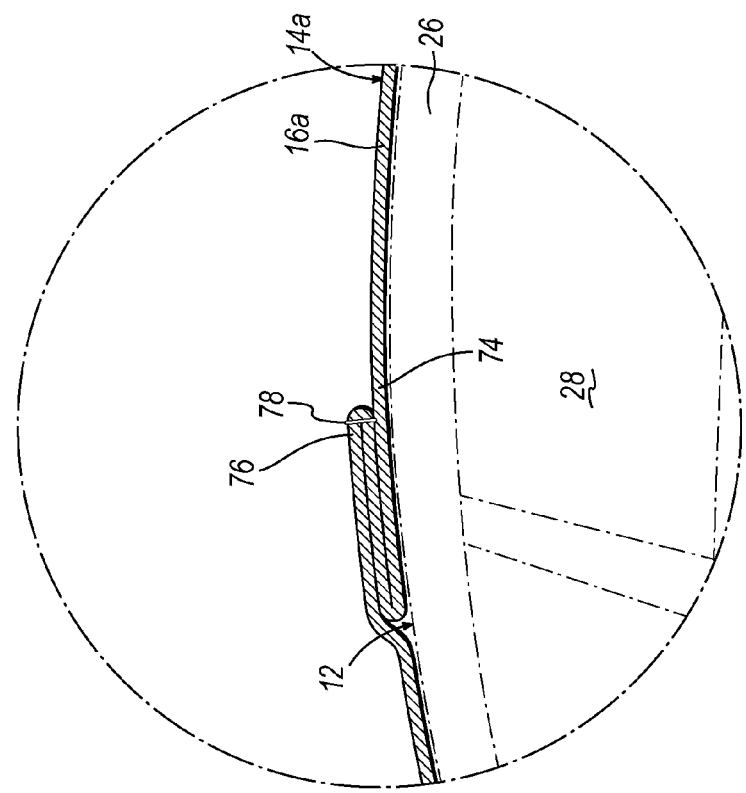

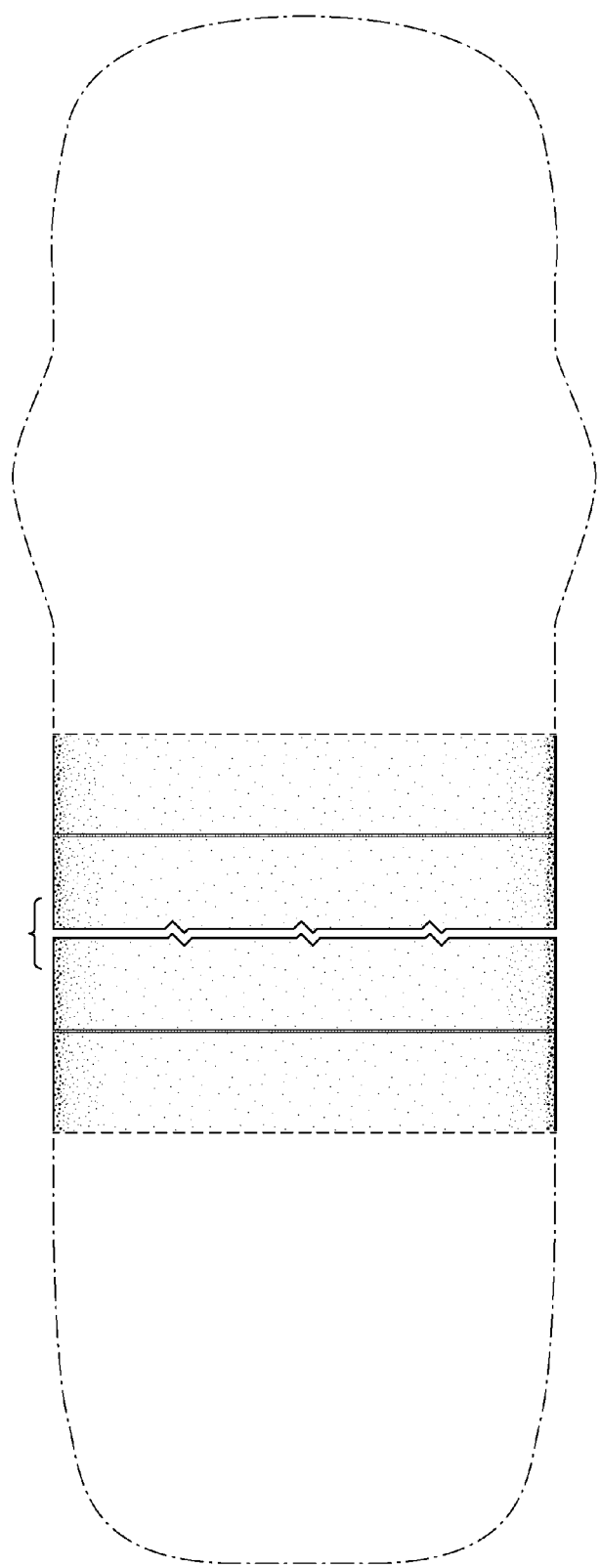

ADJUSTABLE VEHICLE COVER

CROSS-REFERENCE

This application claims the benefit of U.S. Provisional Patent Application Ser. No. 62/152,263, filed Apr. 24, 2015, the disclosure of which is expressly incorporated by reference herein in its entirety.

TECHNICAL FIELD

The present invention relates generally to automotive accessories and, more particularly, to vehicle covers.

BACKGROUND

Vehicle covers are primarily designed to protect vehicles from damage caused by the environment, animals, or even humans. Environmental damage may be caused by rain, snow, wind, dust, and debris that may mar the exterior surface of the vehicle or affect the components of the vehicle.

Conventional vehicle covers are generally referred to as either "custom fit" or "universal fit" covers. Custom fit vehicle covers are generally designed for a specific make and model of a vehicle, and are aesthetically pleasing since they often closely accommodate the shape of the specific vehicle. However, custom fit vehicle covers lack the ability to be utilized on a variety of vehicles. This is problematic because retailers must either stock the specific covers in a quantity sufficient to meet customer demand, or customers must wait for a desired vehicle cover to become available. Both situations are undesirable.

On the other hand, universal fit vehicle covers are designed to loosely accommodate a wide variety of vehicles. Currently available universal fit vehicle covers often poorly fit the vehicle resulting in a poor aesthetic appearance. Since the vehicle may be placed in a visible area, such as in a residential driveway, it is desirable to have an aesthetically pleasing cover placed on the vehicle. In some cases, universal fit vehicle covers may be constructed from an elastic material that better accommodates the shape of the vehicle. However, currently available elastic materials used in these universal vehicle covers generally have poor weather resistance characteristics affecting the ability of the vehicle cover to be utilized for an extended period of time.

As a result, there exists a need for an adjustable vehicle cover that is suitable to fit a variety of vehicles and that has an aesthetically pleasing appearance and is durable.

SUMMARY

The present invention overcomes the foregoing and other shortcomings and drawbacks of known vehicle covers. While the invention will be described in connection with certain embodiments, it will be understood that the invention is not limited to these embodiments. On the contrary, the invention includes all alternatives, modifications, and equivalents as may be included within the spirit and scope of the present invention.

In one embodiment, the adjustable vehicle cover includes a one-piece body cover and at least first and second engagement features. The one-piece body includes at least a top, oppositely disposed first and second sides adjacent to the top, and oppositely disposed first and second ends. The first and second ends are disposed adjacent to the top and the first and second sides. The at least first and second engagement features are disposed intermediate the first and second ends and extend in a direction generally transverse to a longitudinal direction along at least a portion of the first side, the top, and the second side. The at least first and second engagement features are operable to convert the one-piece body between at least a first configuration and a second configuration that is longer than the first configuration in the longitudinal direction. The at least first and second engagement features are joined in the first configuration and are spaced apart in the second configuration.

In another embodiment, a method of adjusting the length or dimension of a vehicle cover to fit a variety of vehicles is disclosed in accordance with the principles of the present disclosure. The vehicle cover includes a one-piece body that includes at least a top, oppositely disposed first and second sides adjacent to the top, and oppositely disposed first and second ends. The first and second ends are disposed adjacent to the top and the first and second sides. The method includes disengaging at least first and second engagement features to expand from a first configuration to a second configuration that is longer than the first configuration in the longitudinal direction, such that the at least first and second engagement features are joined in the first configuration and are spaced apart in the second configuration.

The above and other objects and advantages of the present invention shall be made apparent from the accompanying drawings and the description thereof. Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

FIG. 4 is a schematic side elevation view of the adjustable vehicle cover of FIG. 3 with the first and third engagement features being joined in another configuration.

FIG. 5 is a cross-sectional view of the adjustable vehicle cover similar to FIG. 1 taken along line 5-5 with the adjustable vehicle cover in the first configuration.

FIG. 6A is an enlarged detail view of the encircled area of FIG. 6 with the first and second engagement features being spaced apart in the second configuration according to the first exemplary embodiment.

FIG. 6B is an enlarged detail view similar to FIG. 6A with the first and second engagement features being spaced apart in the second configuration according to the second exemplary embodiment.

FIG. 12 is a top plan view of the adjustable vehicle cover design of FIG. 10.

DETAILED DESCRIPTION

Figure 1:
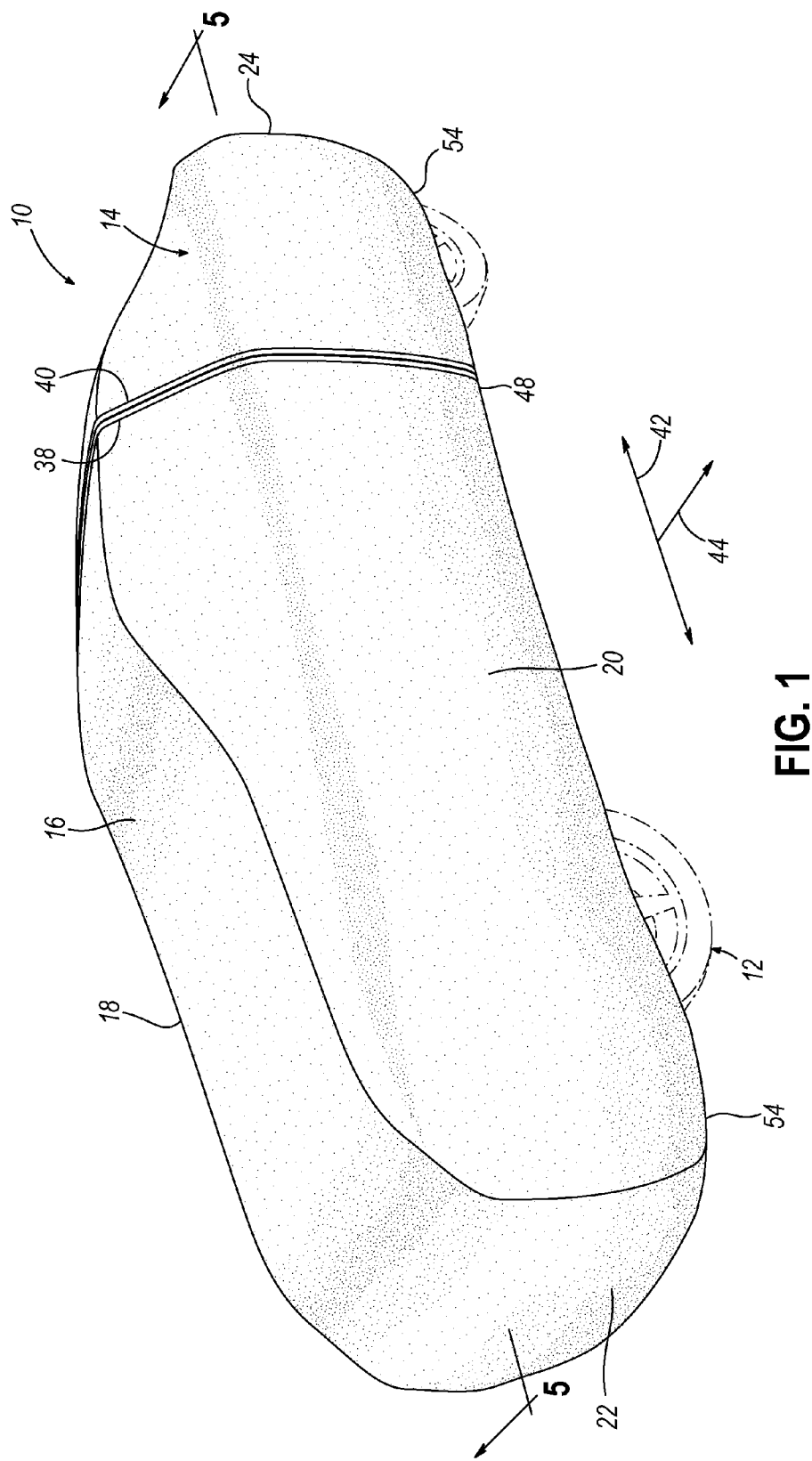
FIG. 1 is a schematic perspective side view of a first exemplary embodiment of an adjustable vehicle cover on a vehicle, with first and second engagement features being joined in a first configuration.
Figure 2:
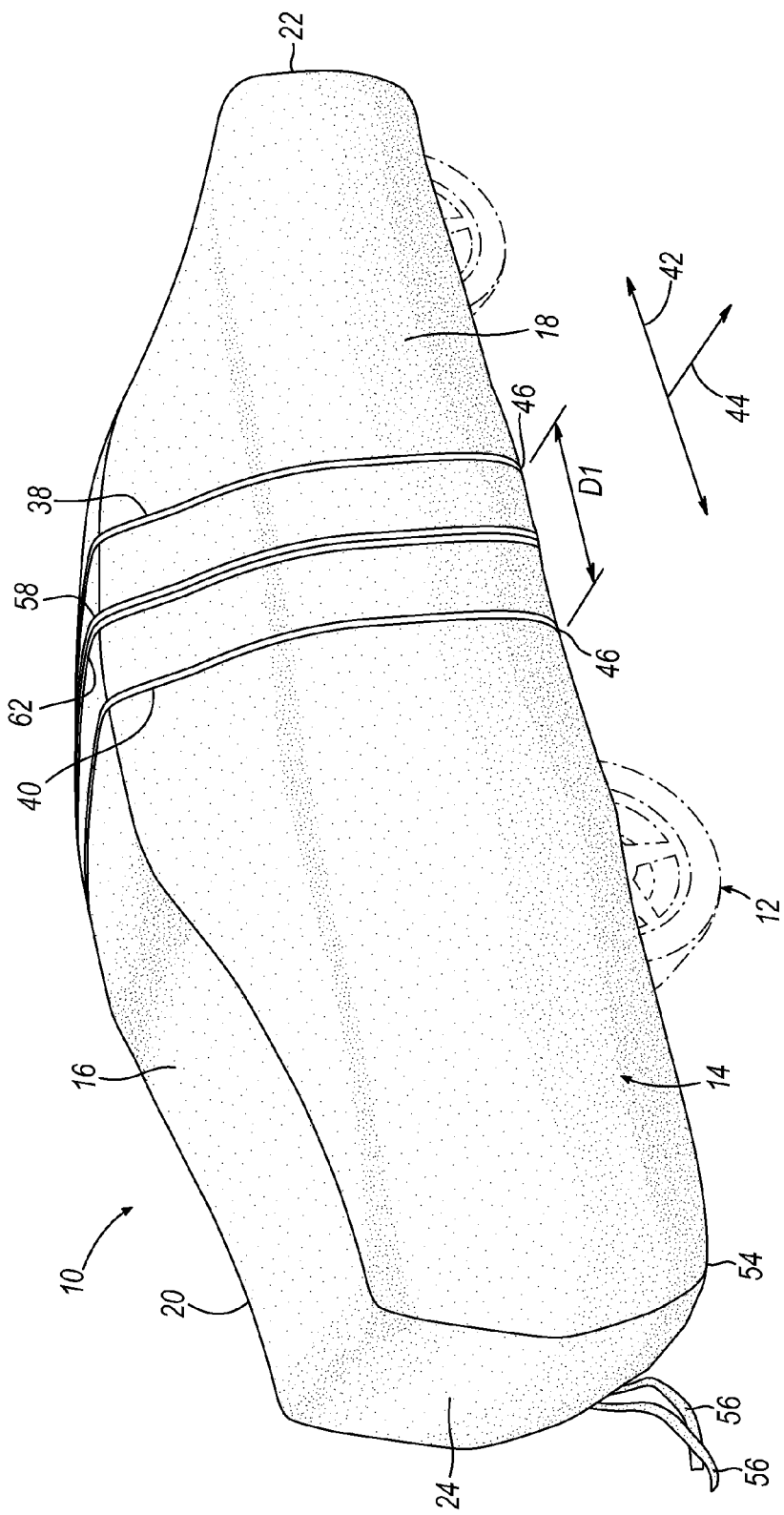
FIG. 2 is a schematic perspective side view of the adjustable vehicle cover of FIG. 1 with the first and second engagement features being spaced apart in a second configuration and with third and fourth engagement features being joined.

FIGS. 1 and 2 illustrate an exemplary adjustable vehicle cover 10 in accordance with the principles of the present disclosure. The adjustable vehicle cover 10 is configured to fit a variety of differently sized vehicles 12, such as, for example, coupes, sedans, station wagons, convertibles, wagons/hatchbacks, crossovers, sport utility vehicles (SUVs), vans, minivans, and pickup trucks.

In one aspect, adjustable vehicle covers 10 in accordance with the principles of the present disclosure may include a single adjustable vehicle cover 10 to fit all types of vehicles. Alternatively, multiple versions of the adjustable vehicle cover 10 may be provided to fit specific classes of vehicles. For example, a car version may be provided for coupes, sedans, station wagons, and convertibles; a van version may be provided for vans and minivans; a truck version may be provided for pickup trucks; and an SUV version may be provided for crossovers and SUVs. The adjustable length vehicle cover 10 is intended to fit a variety of vehicles including: cars (such as coupes, sedans, station wagons, and convertibles), vans (such as vans and minivans), trucks (such as pickup trucks), SUVs (such as crossovers and SUVs), boats, personal watercraft, all-terrain vehicles (ATVs), snowmobiles, motorcycles, and bicycles.

As shown in FIG. 1, the adjustable vehicle cover 10 may be placed over the exterior surface of the vehicle 12 and includes a one-piece body 14. The one-piece body 14 includes at least a top 16, a first side 18 disposed opposite a second side 20, and a first end 22 disposed opposite a second end 24. The top 16 is disposed adjacent to the first and second sides 18, 20 and the first and second ends 22, 24, and is configured to protect the top 26 of the vehicle 12. The first and second sides 18, 20 of the one-piece body 14 are disposed adjacent to the top 16 of the one-piece body 14 and between the first and second ends 22, 24 of the one-piece body 14. With the vehicle 12 being shown best in FIGS. 5-7, the first side 18 of the one-piece body 14 is configured to protect the right side 28 of the vehicle 12, the second side 20 is configured to protect the left side 30 (shown as hidden in FIG. 9) of the vehicle 12, the first end 22 is configured to protect the front portion 32 of the vehicle 12, and the second end 24 is configured to protect the rear portion 34 of the vehicle 12.

As shown and described herein, the adjustable vehicle cover 10 generally surrounds the entire vehicle 12. However, persons skilled in the art will appreciate that the one-piece body 14 may alternatively surround only a portion of the vehicle 12. Such a configuration may sufficiently protect portions of the vehicle 12 while saving material, and this may also allow for easier placement onto the vehicle 12, adjustment while on the vehicle 12, and/or removal of the cover from the vehicle 12. As used herein, a one-piece body 14 is intended to refer to a body that does not have completely separable pieces. The one-piece body 14 may be made from a single piece of material or formed using one or more pieces of material joined together to collectively form the one-piece body 14. Joining methods may include stitching, riveting, ultrasonic bonding, adhesive bonding, and various other suitable joining methods.

The one-piece body 14 may be made from any suitable material. The material is preferably durable, water-repellant, stain-resistant, and breathable. Breathable material prevents moisture build-up between the one-piece body 14 and the exterior surface of the vehicle 12. It is also preferable for the material to protect the exterior surface of the vehicle 12 from harmful UV rays. The material of the one-piece body 14 may further include one or more layers. Each layer may be the same or different depending on the desired characteristics of that particular layer. The side of the layer contacting the exterior surface of the vehicle 12 may be designed to avoid scratching or otherwise damaging the exterior surface of the vehicle 12.

As shown in FIG. 1, the first end 22 of the one-piece body 14 is configured to wrap around the front bumper 50 (shown in FIG. 7) of the vehicle 12, the second end 24 of the one-piece body 14 is configured to wrap around the rear bumper 52 (shown in FIGS. 5-7) of the vehicle 12. As shown in FIGS. 1-4, one or more elastic bands 54 may be incorporated along a portion of the first and second sides 18, 20 and/or the first and second ends 22, 24. The elastic band 54 may be disposed along at least a portion of a bottom terminal edge 46, 48 of the one-piece body 14, and may be configured to retain the adjustable vehicle cover 10 on the vehicle 12. Alternatively, an elastic band 54 may be incorporated along the entire bottom terminal edge of the one-piece body 14 to facilitate securing the adjustable vehicle cover 10 to the vehicle 12.

Figure 3:
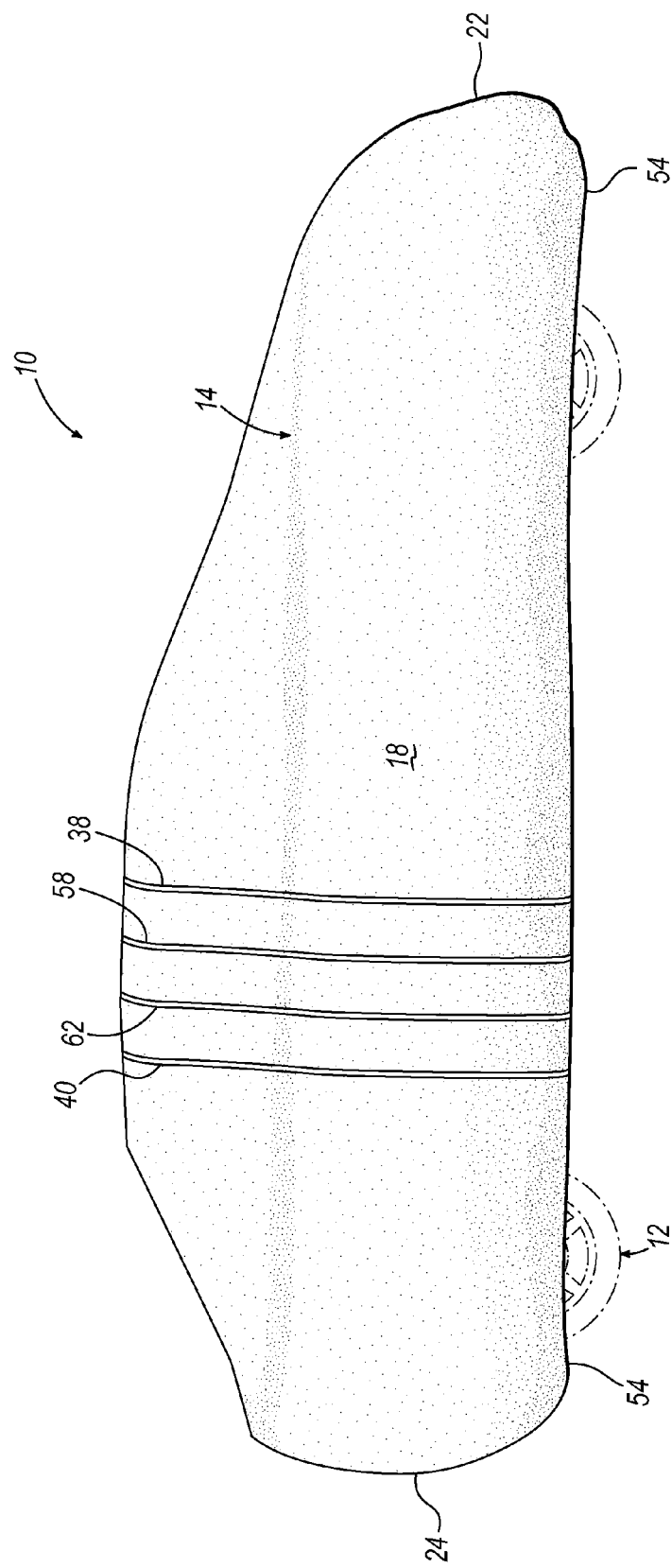
FIG. 3 is a schematic side elevation view of the adjustable vehicle cover of FIG. 2 with the third and fourth engagement features being spaced apart in a third configuration.

With continued reference to FIG. 1, the adjustable vehicle cover 10 includes first and second engagement features 38, 40 disposed intermediate the first and second ends 22, 24. Optionally, additional engagement features, such as a third engagement feature 58 and/or a fourth engagement feature 62 (shown in FIGS. 2 and 3) may be incorporated if desired. One skilled in the art would appreciate that any desired number of engagement features may be included as desired. In this regard, providing a sufficient number of engagement features would effectively result in substantially infinite adjustability. The engagement features convert the adjustable vehicle cover 10 between a first configuration where the adjustable vehicle cover 10 has a first length in a longitudinal direction 42 of the adjustable vehicle cover 10 (as depicted in FIG. 1), a second configuration where the adjustable vehicle cover 10 has a second length in the longitudinal direction 42 (as depicted in FIG. 2), and optionally a third configuration where the adjustable vehicle cover 10 has a third length in the longitudinal direction 42 (as depicted in FIGS. 3 and 4). Each of these configurations will be described in greater detailed below.

As shown, the first and second engagement features 38, 40 are attached to the one-piece body 14 and extend in a direction generally transverse 44 to a longitudinal direction 42 along at least a portion of the first side 18, the top 16, and the second side 20 of the adjustable vehicle cover 10. In this regard, the first and second engagement features 38, 40 may not necessarily extend exactly perpendicular to the longitudinal direction 42 of the adjustable vehicle cover 10, due to manufacturing tolerances, aesthetic appearance, or ease-of-use, for example. While the first and second engagement features 38, 40 is illustrated as extending generally perpendicular to the longitudinal direction 42, it will be appreciated that the first and second engagement features 38, 40 may alternatively extend along a direction that is not perpendicular to the longitudinal direction 42, but rather extend along a direction that is inclined relative to the longitudinal direction 42, as may be desired for aesthetic or functional purposes.

While the first and second engagement features 38, 40 are shown as being generally perpendicular to the longitudinal direction 42, persons skilled in the art will appreciate that typical manufacturing variation and aesthetic preferences may result in the engagement features being situated at an angle, and therefore not perfectly perpendicular, but rather generally transverse 44 to the longitudinal direction 42 of the vehicle 12. The first engagement feature 38 is shown as being generally parallel to the second engagement feature 40. However, it may be beneficial to have non-parallel first and second engagement features 38, 40 to accommodate specific features and geometries of vehicles for which the adjustable vehicle cover 10 may be used. Additionally, the distance between the first and second engagement features 38, 40 may vary.

The first and second engagement features 38, 40 as shown and described in FIG. 1, are generally positioned near the middle of the first side 18, the top 16, and second side 20 of the one-piece body 14, since the cross-sectional shape and dimensions across a variety of vehicle makes and models is generally uniform in this region. As a result, the cross-sectional variation between the first and second engagement features 38, 40 may be lessened. This results in the first engagement feature 38 better aligning with the second engagement feature 40, and allows the adjustable vehicle cover 10 to more closely accommodate a variety of vehicles 12. This is advantageous when the first and second engagement features 38, 40 extend continuously across the one-piece body 14, since the generally uniform cross-section allows the first and second engagement features 38, 40 to be approximately the same length. While the first and second engagement features 38, 40 depicted in FIG. 1 are generally positioned near the middle of the length of the adjustable vehicle cover 10, the first and second engagement features 38, 40 may alternatively be positioned at other areas of the adjustable vehicle cover 10, as may be desired.

In the embodiment shown and described with respect to FIG. 1, the first and second engagement features 38, 40 extend continuously along the entire first side 18, top 16, and second side 20 of the one-piece body 14 in the direction generally transverse 44 to the longitudinal direction 42 of the vehicle 12. In other words, the first and second engagement features 38, 40 begin at the bottom terminal edge 46 of the first side 18, extend along the entire top 16, and terminate at the bottom terminal edge 48 of the second side 20 of the one-piece body 14. It will be appreciated, however, that the first and second engagement features 38, 40 need not extend continuously along the entire first side 18, the top 16, and the second side 20 of the one-piece body 14. Rather, persons skilled in the art will appreciate that the first and second engagement features 38, 40 may alternatively begin and terminate at a distance from the edge of the first and second sides 18, 20 of the one-piece body 14, and/or that the first and second engagement features 38, 40 may be intermittently spaced across the first and second sides 18, 20 and the top 16 of the one-piece body 14, or occur only at key transitional locations.

In the first configuration, excess material 60 from the one-piece body 14 of the adjustable vehicle cover 10 is gathered between the vehicle 12 and the first and second engagement features 38, 40. The material gathered between the vehicle 12 and the first and second engagement features 38, 40 may be secured or loose. By capturing the excess material 60 between the vehicle 12 and the first and second engagement features 38, 40, the one-piece body 14 of the adjustable vehicle cover 10 has an improved aesthetic appearance. Further, the excess material 60 is protected from the environment and may even act to supplement the protection offered by the material.

With continued reference to FIG. 1, the first and second engagement features 38, 40 are joined in the first configuration. As used herein, "joined" is intended to include where the engagement features are directly joined together (such as through the use of zippers, snaps, or hook-and-loop type connectors, such as Velcro®) or indirectly joined (such as using a frangible portion to join the first and second engagement features 38, 40). By disengaging the first and second engagement features 38, 40, the one-piece body 14 expands from a first configuration to a second configuration as will now be described.

FIG. 2 shows the adjustable vehicle cover 10 in the second configuration, where the first engagement feature 38 is located at a distance D1 from the second engagement feature 40. As a result, the one-piece body 14 is longer in the longitudinal direction 42 in the second configuration than in the first configuration. This allows the adjustable vehicle cover 10 to accommodate a shorter vehicle 12 while in the first configuration and a longer vehicle 12 while in the second configuration.

FIG. 3 shows the adjustable vehicle cover 10 in a third configuration where the first, second, third, and fourth engagement features 38, 40, 58, 62 are spaced apart from one another. This configuration may accommodate a larger vehicle than the first configuration and a smaller vehicle than the second configuration FIG. 4 shows the adjustable vehicle cover 10 in another configuration where the first engagement feature 38 is joined to the third engagement feature 58, with the second engagement feature being spaced apart at a distance. The fourth engagement feature 62 may be omitted.

Figure 5A:
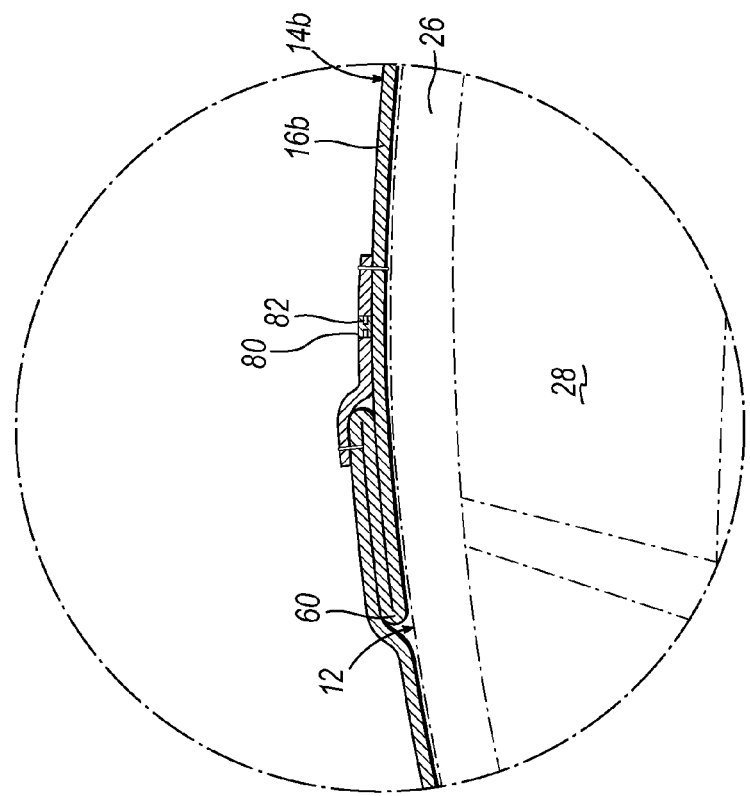
FIG. 5A is an enlarged detail view of the encircled area of FIG. 5 with the first and second engagement features being joined in the first configuration according to the first exemplary embodiment.
Figure 5B:
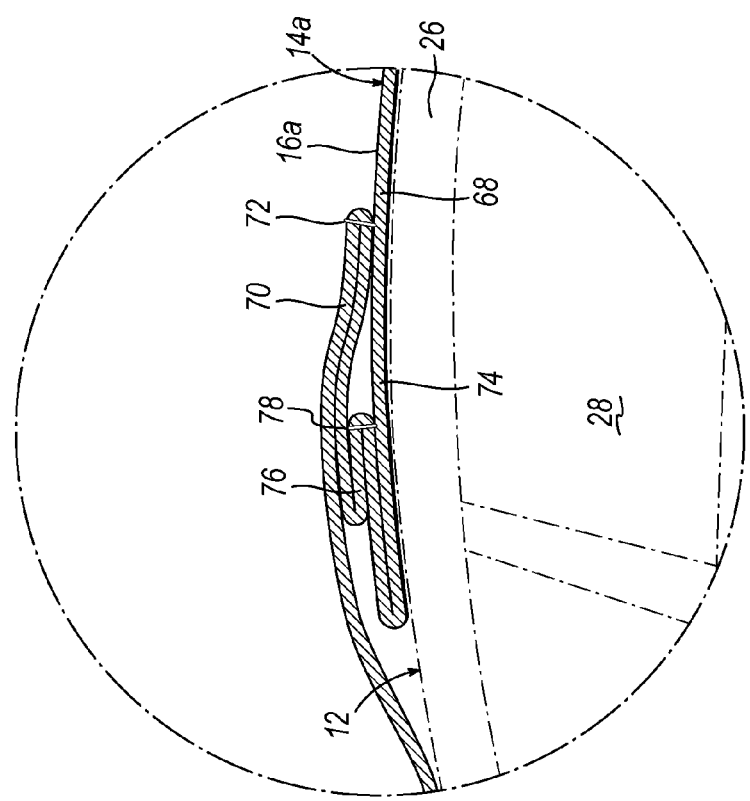
FIG. 5B is an enlarged detail view similar to FIG. 5A with the first and second engagement features being joined in the first configuration according to the second exemplary embodiment.
Figure 6:
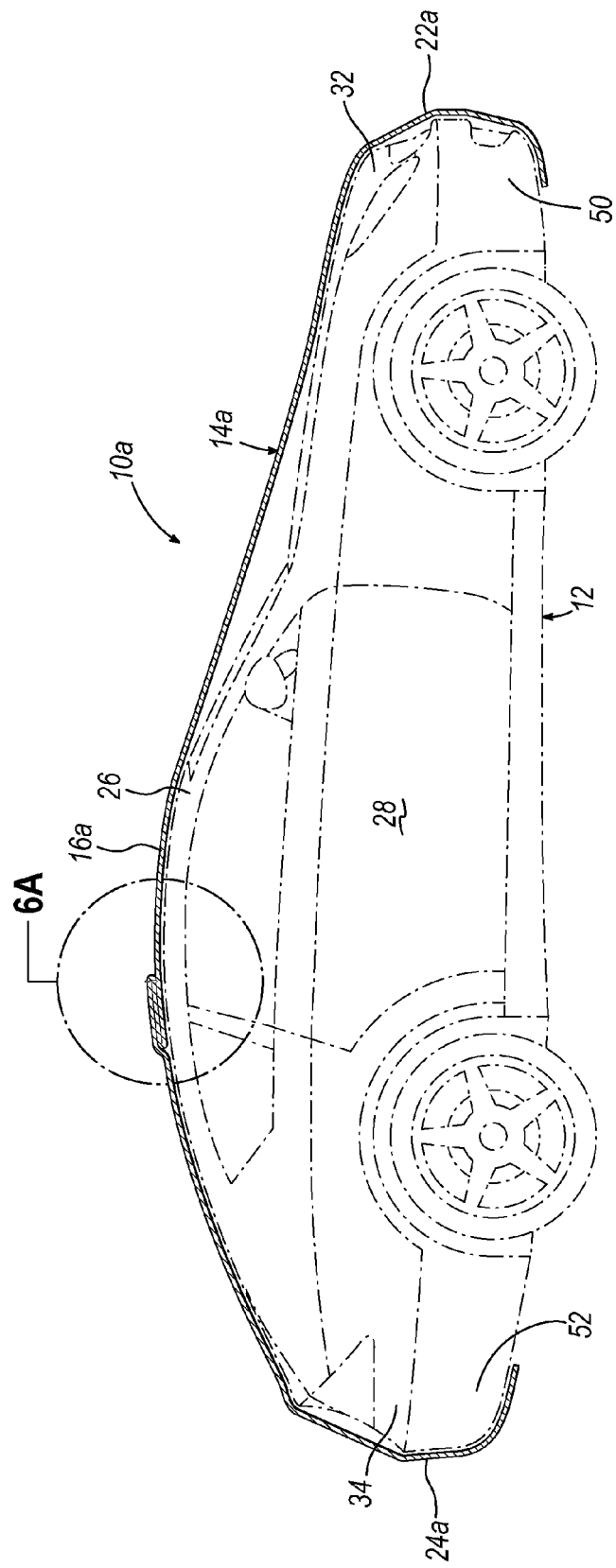
FIG. 6 is a cross-sectional view of the adjustable vehicle cover similar to FIG. 2, in the second configuration and used with a different vehicle.
Figure 7:
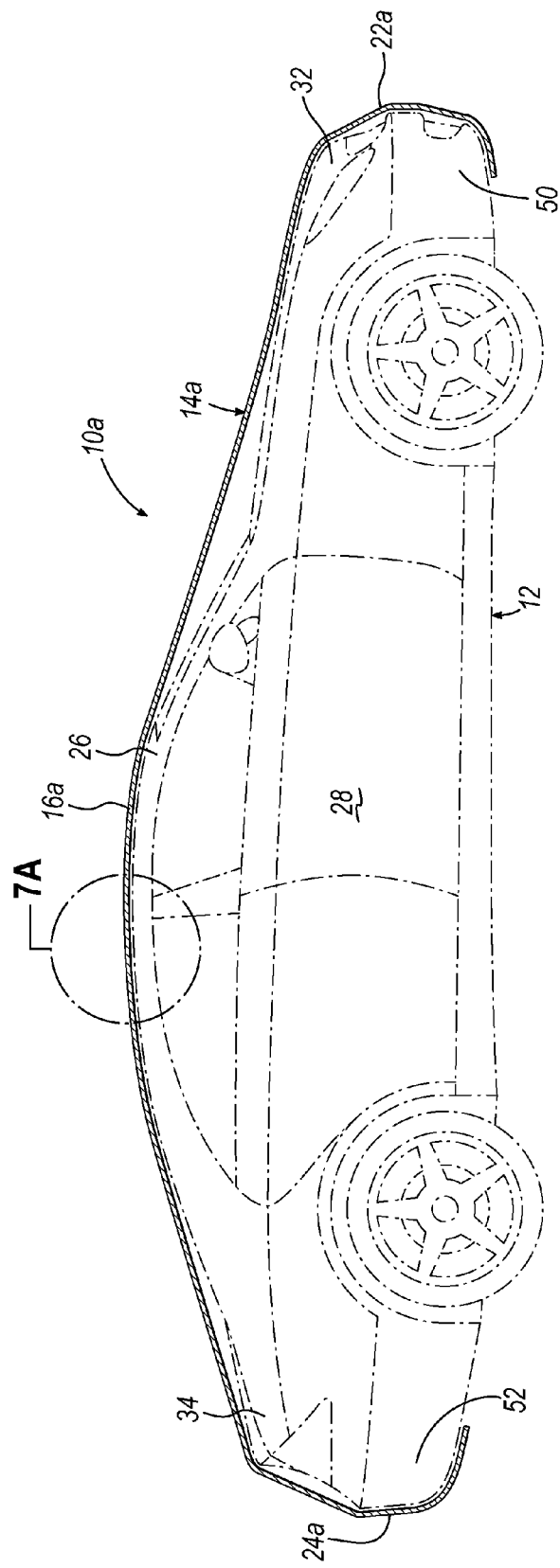
FIG. 7 is a cross-sectional view of the adjustable vehicle cover similar to FIG. 3 in a third configuration and used with a different vehicle.

Referring now to FIGS. 5-7, the first and second exemplary embodiments will be described in accordance with the principles of the present disclosure, wherein similar reference numerals refer to similar features shown in FIGS. 1-4. FIG. 5 shows the first configuration of the adjustable vehicle cover 10a, FIG. 6 shows the second configuration of the adjustable vehicle cover 10a, and FIG. 7 shows the third configuration of the adjustable vehicle cover 10a. FIGS. 5, 6, and 7 each show the one-piece body 14a of the adjustable vehicle cover 10a as including at least a top 16a, a second side 20a, and a first end 22a disposed opposite a second end 24a.

Detailed section views show a side-by-side illustration of the first and second exemplary embodiments for the first, second, and third configurations. Specifically, the first exemplary embodiment is shown in enlarged detail views of FIGS. 5A, 6A, and 7A, while the second exemplary embodiment is shown in the enlarged detail views of FIGS. 5B, 6B, and 7B. While FIG. 6A shows four engagement features, and FIG. 6B shows three engagement features, more or less engagement features are envisioned and may be preferred, possibly due to cost and adjustability.

Figure 7B:
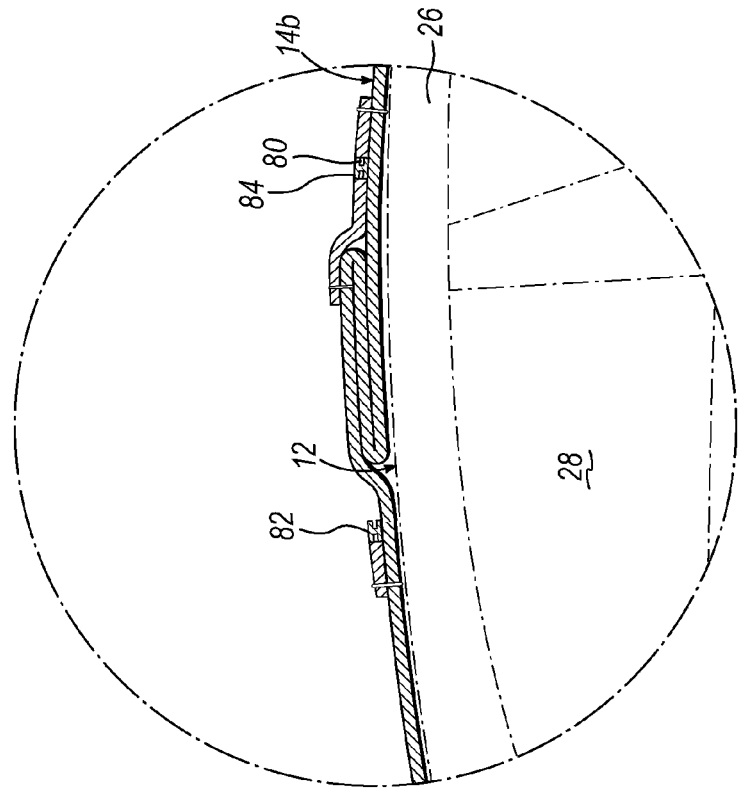
FIG. 7B is an enlarged detail view similar to FIG. 7A with the third and fourth engagement features being separated in the third configuration according to the second exemplary embodiment.
Figure 7A:
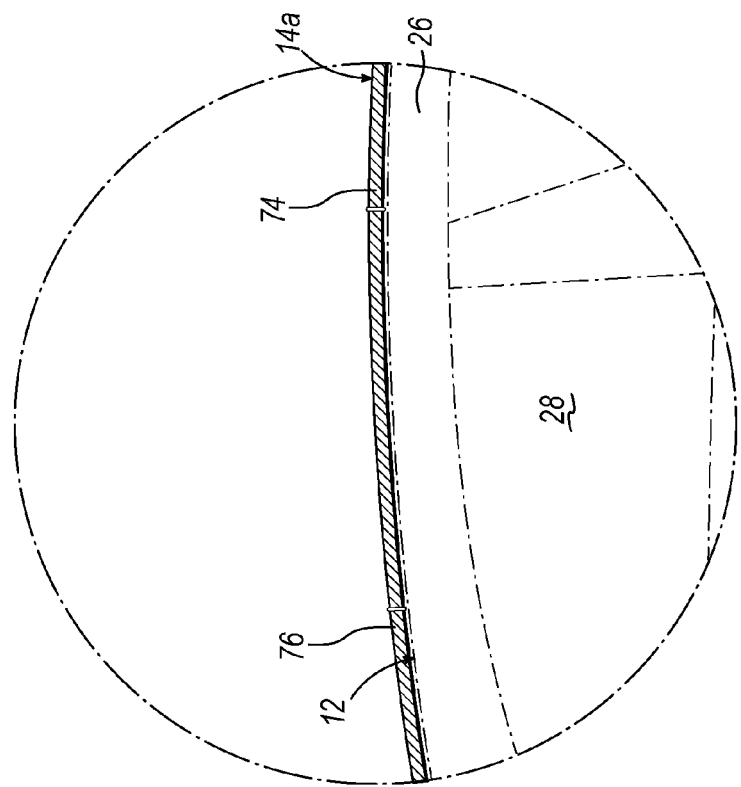
FIG. 7A is an enlarged detail view of the encircled area of FIG. 7 with the third and fourth engagement features being spaced apart in the third configuration according to the first exemplary embodiment.

According to a first exemplary embodiment as shown in FIGS. 5A, 6A, and 7A, the first, second, third, and fourth engagement features 38, 40, 58, 62 are shown as first, second, third, and fourth portions 68, 70, 74, 76 of the one-piece body 14 that are frangibly joined. The first and second portions 68, 70 may be frangibly joined in the first configuration (as depicted by FIG. 5A), and may be separated from one another in the second configuration (as depicted by FIG. 5B) to expand the one-piece body 14 in the longitudinal direction 42. As used herein, frangibly joined is intended to refer to any type of attachment of the engagement features to the one-piece body 14 that is intended to be broken to expand the one-piece body 14, and includes, for example, stitching, adhesive, welding, or any other method suitable to frangibly join the first and second portions 68, 70.

According to a specific illustration of the first exemplary embodiment, the first and second portions 68, 70 of the one-piece body 14 may be frangibly joined in the first configuration (as depicted by FIG. 5A) using at least a first stitched seam 72 that is broken to expand the one-piece body 14 in the longitudinal direction 42 to the second configuration (as depicted by FIG. 6A). The stitched seam(s) may be broken by any suitable method, such as, for example, by using a dull or sharp edge of an object. A specific seam splitting instrument may be included with the adjustable vehicle cover 10 to facilitate separating the first and second portions 68, 70.

Similarly, the third and fourth portions 74, 76 of the one-piece body 14 are frangibly joined by a second stitched seam 78 in FIG. 6A, which may be broken to form the third configuration (as depicted by FIG. 7A). Breaking the second stitched seam 78 separates the third and fourth portions 74, 76 of the one-piece body 14 to convert the one-piece body 14 to the third configuration. The second stitched seam 78 may be concealed by the first stitched seam 72, whereby in the first configuration, separating the first and second portions 68, 70 exposes access to the second stitched seam 78 as shown in FIG. 2. Alternatively, the first and second stitched seams 72, 78 may be arranged to facilitate breaking independently of one another.

According to a second exemplary embodiment as shown in FIGS. 5B, 6B, and 7B, the at least first and second engagement features 38, 40 may be in the form of zippers, clasps, snaps, buttons, hooks, and hook-and-loop type connectors (such as Velcro®). These types of engagement features may be attached to the one-piece body 14b of the adjustable vehicle cover 10b using stitching, riveting, ultrasonic bonding, adhesive bonding, and/or various other suitable attachment methods.

For example, according to a specific illustration of the second exemplary embodiment, the first, second, and third engagement features 38, 40, 58 are shown as first, second, and third zipper teeth 80, 82, 84. As shown in FIG. 5B, the first and second zipper teeth 80, 82 are selectively engageable and disengageable to convert the one-piece body 14b from and between the at least first and second configurations. As used herein, selectively engageable and disengageable is intended to include where the engagement features are capable of being engaged and subsequently disengaged, or vice-a-versa, with the same or different engagement features. Disengaging the first and second zipper teeth 80, 82 expands the one-piece body 14b in the longitudinal direction 42 from the first configuration to the second configuration (as depicted by FIG. 6B). Thereafter, the first and second zipper teeth 80, 82 may be selectively reengaged to shorten the one-piece body 14b in the longitudinal direction 42 from the second configuration to the first configuration. The enlarged detail views shows the top 16b of the one-piece body 14b FIG. 7B shows the adjustable vehicle cover 10b in the third configuration, where the first zipper teeth 80 are selectively engaged with the third zipper teeth 84 to shorten the one-piece body 14b. This third configuration results in a body length that is shorter than the first configuration, but longer than the second configuration in the longitudinal direction 42. While not shown, the third zipper teeth 84 may be selectively engageable with second zipper teeth 82 to form a different configuration. Also while not shown, a strip of material may be incorporated into the one-piece body 14b to shield the zipper from view, resulting in the zipper appearing less noticeable.

Figure 8:
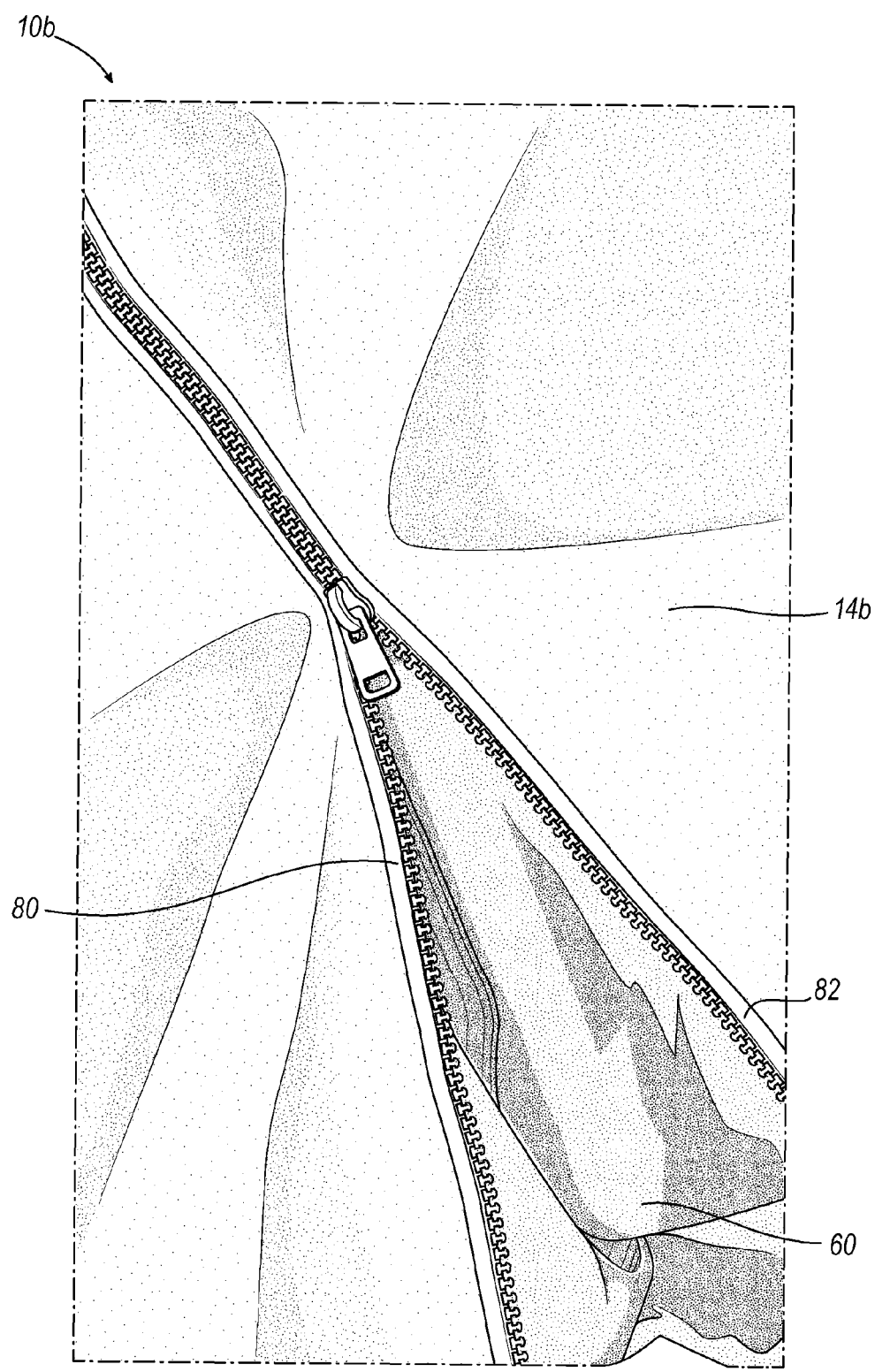
FIG. 8 is an enlarged detail view of the second exemplary embodiment, with first and second zipper teeth being engaged to convert from the first configuration to the second configuration.

FIG. 8 show an enlarged detail view of the first and second engagement features 38, 40 in the form of a zipper having first and second zipper teeth 80, 82. The first and second zipper teeth 80, 82 are selectively engageable to convert the adjustable vehicle cover 10b between a first configuration and a second configuration. When engaged, the excess material 60 is hidden from view, for example, gathered between the vehicle 12 and one-piece body 14b in the first configuration, by the first and second engagement features 38, 40, resulting in a more visually appealing adjustable vehicle cover 10b.

While not shown, one or more closure mechanisms may be disposed adjacent the at least first and second engagement features 38, 40 and extending in a generally longitudinal direction 42. The closure mechanism(s) may be utilized to prevent the first and second engagement features 38, 40 from loosening or opening due to the elastic from the edge pulling on the first and second engagement features 38, 40. Suitable closure mechanisms may include clasps, snaps, buttons, hooks, and hook-and-loop type connectors. However, persons skilled in the art will appreciate that various other suitable closure mechanisms that prevent the first, second, third and/or fourth engagement features 38, 40, 58, 62 from loosening or opening may also be utilized.

Figure 9:
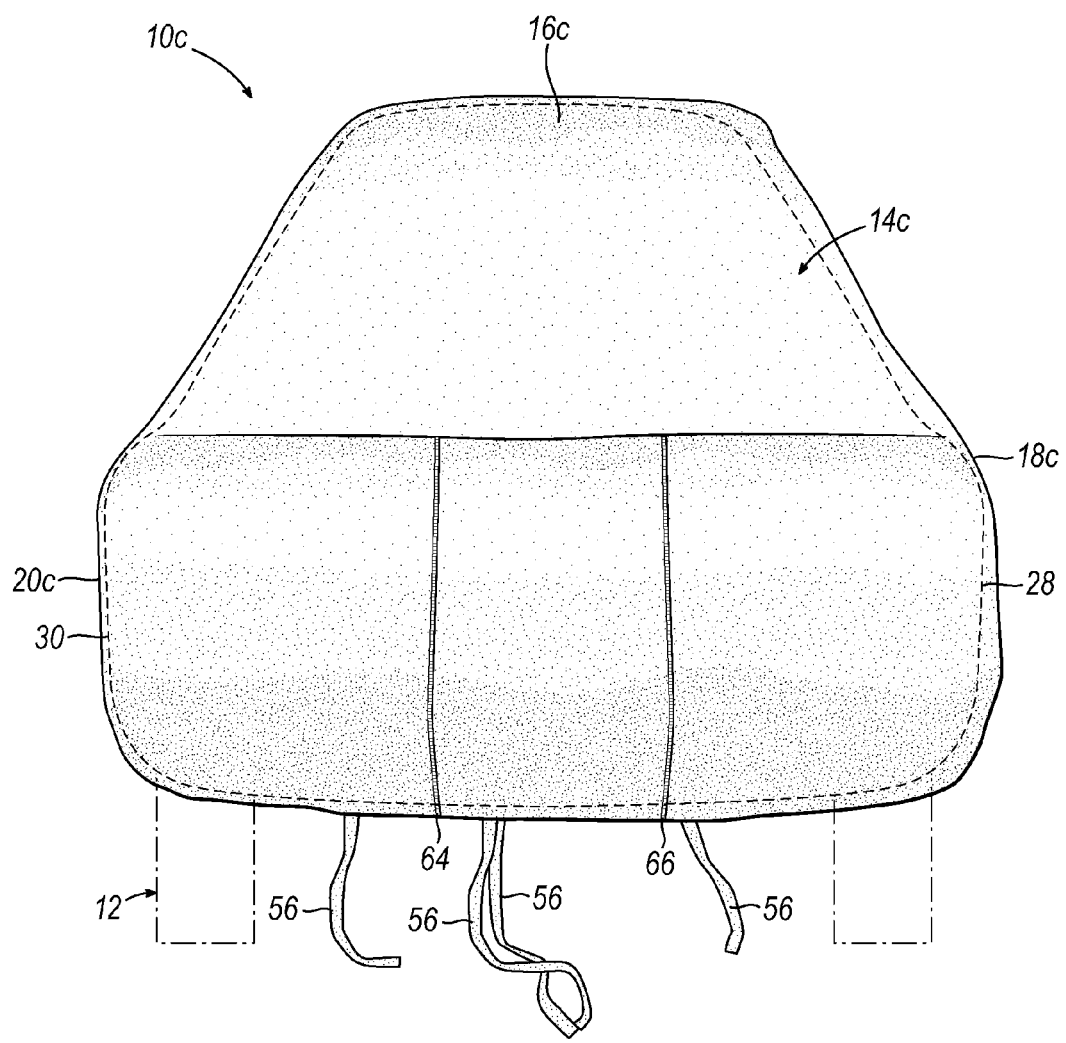
FIG. 9 is a rear view of a third exemplary embodiment of an adjustable vehicle cover having first and second width engagement features in a second width configuration.

Referring now to FIG. 9, a third exemplary embodiment of an adjustable vehicle cover 10c is shown in accordance with the principles of the present disclosure, wherein similar reference numerals refer to similar features as shown in FIGS. 1-8. As shown, the one-piece body 14c of the adjustable vehicle cover 10c includes at least a top 16c, and a first side 18c disposed opposite a second side 20c. In this embodiment, the adjustable vehicle cover 10c may further include, or may alternatively comprise, at least first and second width engagement features 64, 66. The first and second width engagement features 64, 66 may operate substantially similar to the first and second engagement features 38, 40 of the first and second exemplary embodiments described above with respect to FIGS. 1-7. The first and second width engagement features 64, 66 may be disposed intermediate the first and second sides 18c, 20c and may extend in a direction generally parallel to the longitudinal direction 42 along the first end 22c, the top 16c, and the second end 24c.

The first and second width engagement features 64, 66 may be in the form of first and second width portions that are frangibly joined as discussed above. Alternatively, or in addition to, the first and second width engagement features 64, 66 may be in the form of zippers, clasps, snaps, buttons, hooks, and hook-and-loop type connectors (such as Velcro®) as described above. Persons skilled in the art will appreciate that multiple types of engagement width features in combination may be utilized in any suitable combination, such as, for example, a zipper and snaps. While not shown, to form the first width configuration, the first width engagement feature 64 may be selectively engaged with the second width engagement feature 66.

With continued reference to FIG. 9, the at least first and second width engagement features 64, 66 are spaced apart and disposed in a direction generally parallel to the longitudinal direction 42. Similar to the at least first and second engagement features 38, 40 described above, the at least first and second width engagement features 64, 66 are selectively engageable to convert between at least first and second width configurations, wherein the second width configuration is longer than the first width configuration in the direction generally transverse 44 to the longitudinal direction 42.

While not shown, a third width engagement feature may define a third width configuration when the first width engagement feature 64 is selectively engaged with the third width engagement feature. Similar to the second configuration, to form the second width configuration, the first width engagement feature 64 is not engaged with either the second width engagement feature 66 or the third width engagement feature. Rather, the first width engagement feature 64 is separated at a distance from the third width engagement feature, and the third width engagement feature is separated at a distance from the second width engagement feature 66. The third width configuration results in a body width that is shorter than the first width configuration, but longer than the second width configuration in the direction generally transverse 44 to the longitudinal direction 42. The distance between the first width engagement feature 64 and third width engagement feature may be the same or different than the distance between the second width engagement feature 66 and third width engagement feature.

The first and second engagement features 38, 40 may be provided already attached to the one-piece body 14. Alternatively, the first and second attachment features 38, 40 may be provided separately, requiring later attachment to the one-piece body 14. For example, the first and second engagement features 38, 40 may be provided separately as an "add on" kit.

As shown in FIGS. 2 and 9, one or more tie down straps 56 may be incorporated to secure the adjustable vehicle cover 10 to the vehicle 12. The tie down straps 56 may be used alone or in combination with the elastic band 54. FIG. 2 shows two tie down straps 56, while FIG. 9 shows four tie down straps 56.

While not shown, first and second engagement features 38, 40 may extend on one portion of the one-piece body 14 while third and fourth engagement features 58, 62 may extend along a different portion of the one-piece body 14, allowing the adjustable vehicle cover 10 to even more closely accommodate the vehicle 12. For example, to accommodate different sized pickup truck bed lengths, the third and fourth engagement features 58, may be placed near the second end 24 of the one-piece body 14, in addition to or in place of, the first and second engagement features 38, 40 being positioned generally near the middle of the first side 18, the top 16, and second side 20 of the one-piece body 14.

In one exemplary embodiment, first and second engagement features 38, 40 as shown above may be utilized in combination with first and second width engagement features 64, 66. The first and second width engagement features 64, 66 may extend along the trunk and rear portion 34 of the vehicle 12, while third and fourth width engagement features (not shown) may extend along the hood and front portion 32 of the vehicle 12. The at least first and second width engagement feature 64, 66 are positioned so as not to interfere with the operation of the first and second engagement features 38, 40.

Figure 10:
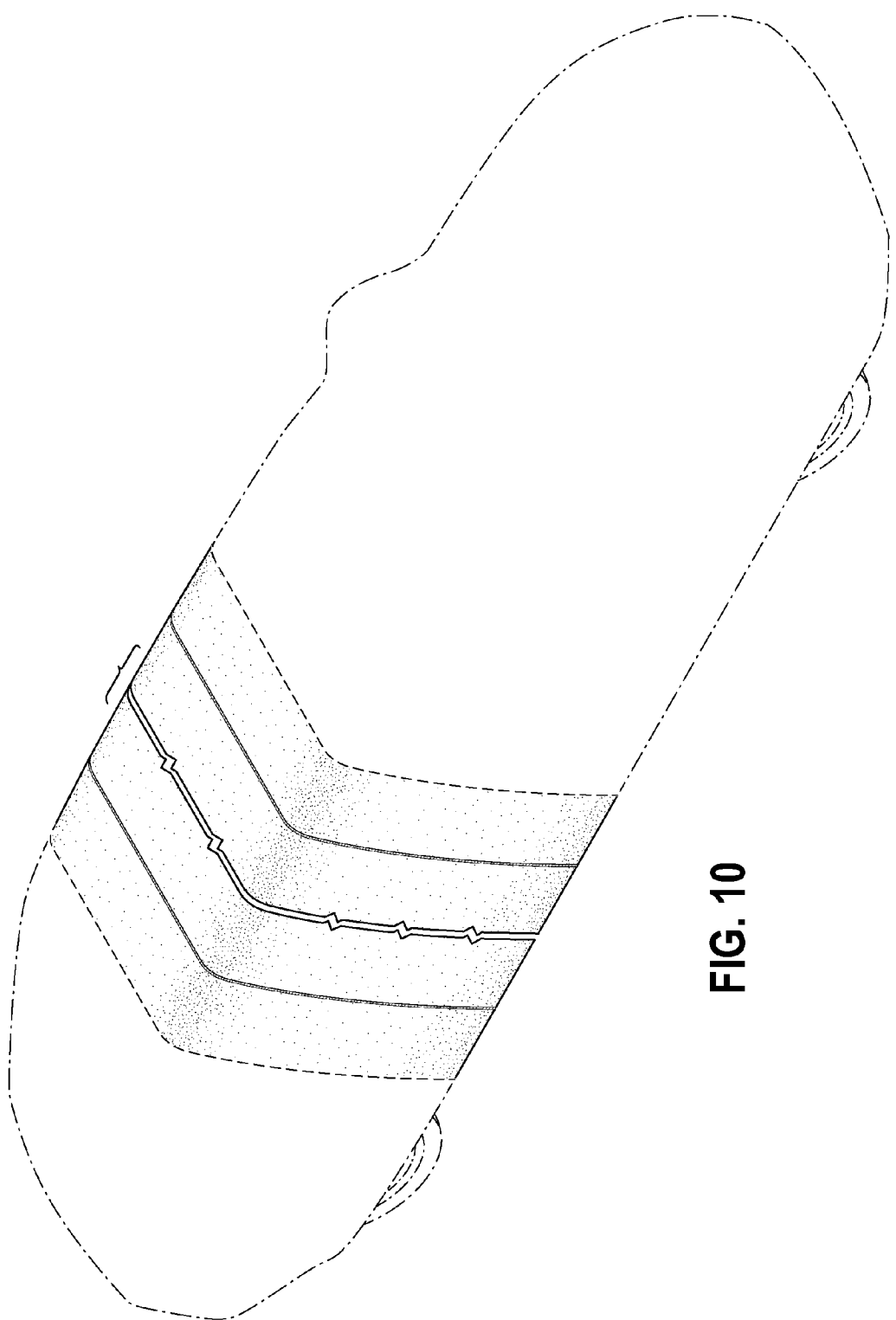
FIG. 10 is a side perspective view of a fourth exemplary embodiment of an adjustable vehicle cover design in a second configuration.
Figure 11:
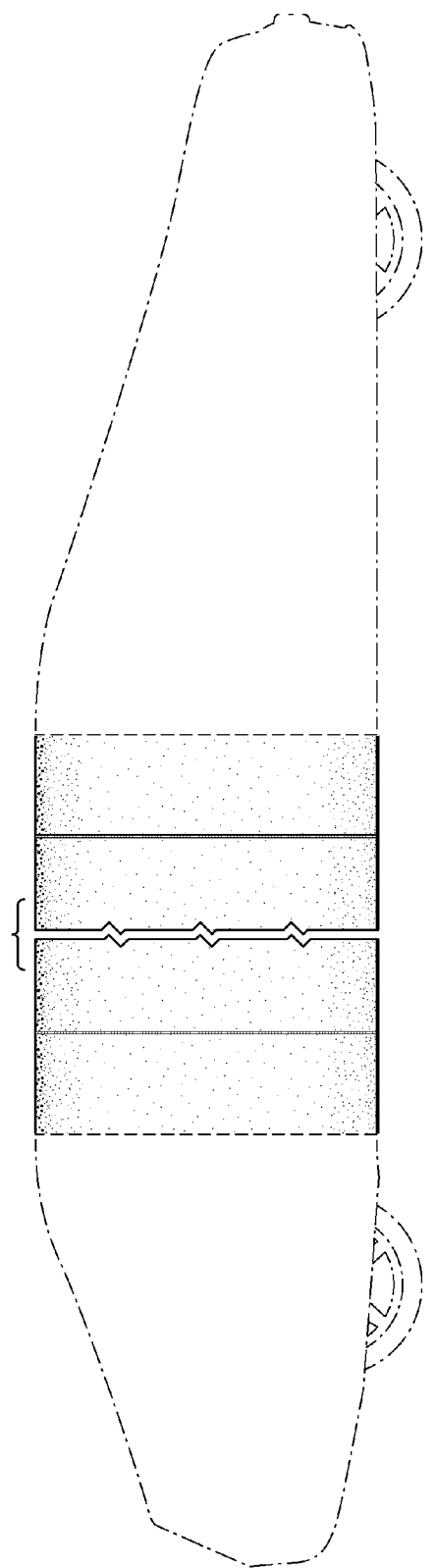
FIG. 11 is a right-side elevation view of the adjustable vehicle cover design of FIG. 10, the left-side elevation view being a mirror image.

FIGS. 10-12 are various views of a fourth exemplary embodiment of an adjustable vehicle cover design in accordance with the principles of the present disclosure. In this exemplary embodiment, the portions of the adjustable vehicle cover design depicted in broken dash lines are intended to represent the bounds of the adjustable vehicle cover design and form no part of the claimed design. It is understood that the bracketed broken away portion of the adjustable vehicle cover is intended to denote an indeterminate length. Neither the lines themselves, nor the region within the lines, form any part of the claimed design.

While the exemplary embodiments of the present invention have been shown and described herein for one with vehicles 12, it will be appreciated that adjustable covers in accordance with the principles of the present disclosure could also be applied to covers for other objects, such as covers for outdoor grills and patio furniture (including patio chairs and patio tables).

While the present invention has been illustrated by a description of one or more embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit and scope of the general inventive concept.

What is claimed is:

1. An adjustable vehicle exterior cover configured to fit a variety of vehicles, the adjustable vehicle cover comprising:
a unitary one-piece body including at least a top, oppositely disposed first and second sides adjacent to the top, and oppositely disposed first and second ends, wherein the first and second ends are disposed adjacent to the top and the first and second sides, and wherein the one-piece body covers the vehicle and does not have completely separable pieces; and
at least first and second portions of the one-piece body that are frangibly joined in a first configuration and are spaced apart in a second configuration to expand the one-piece body in a longitudinal direction, the at least first and second portions of the one-piece body being disposed intermediate the first and second ends and extending in a direction generally transverse to the longitudinal direction along at least a portion of the first side, the top, and the second side.

2. The adjustable vehicle cover according to claim 1, wherein excess material of the one-piece body is gathered between the vehicle and one-piece body in the first configuration.

3. The adjustable vehicle cover according to claim 1, wherein the at least first and second portions of the one-piece body are frangibly joined using at least one of:
   stitching, adhesive, or welding.

4. The adjustable vehicle cover according to claim 1, wherein the at least first and second portions of the one-piece body further comprise:
   third and fourth portions of the one-piece body that are frangibly joined in either the first or second configuration, and are separated from one another in a third configuration to expand the one-piece body in the longitudinal direction.

5. The adjustable vehicle cover according to claim 1, wherein the first and second portions of the one-piece body are frangibly joined in the first configuration using at least a first stitched seam extending in the direction generally transverse to the longitudinal direction along at least a portion of the first side, the top, and the second side,
   wherein the first stitched seam is broken to expand the one-piece body in the longitudinal direction to the second configuration.

6. The adjustable vehicle cover according to claim 5, wherein the at least first and second portions of the one-piece body further comprise:
   third and fourth portions of the one-piece body that are frangibly joined in either the first or second configuration using at least a second stitched seam extending in the direction generally transverse to the longitudinal direction along at least a portion of the first side, the top, and the second side,
   wherein the second stitched seam is broken to expand the one-piece body in the longitudinal direction to a third configuration.

7. The adjustable vehicle cover according to claim 6, wherein the first and second stitched seams are expandable independently of one another.

8. The adjustable vehicle cover according to claim 6, wherein the second stitched seam is concealed by the first stitched seam, such that separating the first and second portions exposes access to the second stitched seam.

9. The adjustable vehicle cover according to claim 1, wherein the at least first and second portions of the one-piece body extend continuously in the direction generally transverse to the longitudinal direction along the first side, the top, and the second side.

10. The adjustable vehicle cover according to claim 1, further comprising:
    at least one closure mechanism disposed adjacent the at least first and second portions of the one-piece body and configured to prevent the at least first and second portions of the one-piece body from loosening or opening.

11. A method of adjusting the length or dimension of a vehicle exterior cover to fit a variety of vehicles, the vehicle cover including a unitary one-piece body that includes at least a top, oppositely disposed first and second sides adjacent to the top, and oppositely disposed first and second ends, wherein the one-piece body covers the vehicle and does not have completely separable pieces, and wherein the first and second ends are disposed adjacent to the top and the first and second sides, the method comprising:
    separating at least first and second portions of the one-piece body that are frangibly joined in a first configuration such that the one-piece body is expanded in the longitudinal direction to a second configuration that is longer than the first configuration in the longitudinal direction.

12. The method of claim 11, wherein the first and second portions of the one-piece body are frangibly joined by at least a first stitched seam, whereby the separating first and second portions of the one-piece body further comprises:
    breaking the first stitched seam that extends in the direction generally transverse to the longitudinal direction along at least a portion of the first side, the top, and the second side to expand the one-piece body in the longitudinal direction to the second configuration.

13. The method of claim 12, further comprising:
    separating third and fourth portions of the one-piece body that are frangibly joined in either the first or second configuration, and are separated from one another in a third configuration to expand the one-piece body in the longitudinal direction.

14. The method of claim 13, wherein the third and fourth portions of the one-piece body are frangibly joined by at least a second stitched seam, whereby the separating third and fourth portions of the one-piece body further comprises:
    breaking the second stitched seam that extends in the direction generally transverse to the longitudinal direction along at least a portion of the first side, the top, and the second side to expand the one-piece body in the longitudinal direction to the third configuration.

* * * * *